United States Patent [19]

White et al.

[11] 3,855,178

[45] Dec. 17, 1974

[54] METHOD FOR MAKING POLYETHERIMIDES

[75] Inventors: Dwain M. White, Schenectady; Frank J. Williams, III, Scotia, both of N.Y.

[73] Assignee: General Electric Company, Schenectady, N.Y.

[22] Filed: Dec. 3, 1973

[21] Appl. No.: 421,220

[52] U.S. Cl. 260/45.7 S, 260/30.8 DS, 260/32.6 N, 260/33.6 R, 260/47 CZ, 260/45.95 J
[51] Int. Cl. ........................................... C08f 45/54
[58] Field of Search ...... 260/45.95 J, 45.7 S, 47 CZ

[56] References Cited
UNITED STATES PATENTS
2,745,882  5/1956  Hale .............................. 260/45.95 J
3,803,103  4/1974  Magay ............................ 260/78 TF Primary Examiner—Melvyn I. Marquis
Attorney, Agent, or Firm—William A. Teoli; Joseph T. Cohen; Jerome C. Squillaro

[57] ABSTRACT

A method is provided for making polyetherimides having improved heat stability involving the initial production of a polyetherimide by the nitro-displacement of dinitro-bisimide with alkali diphenoxide and the employment with the resulting polyetherimide of an alkali metal phenoxide stabilizer.

10 Claims, No Drawings

METHOD FOR MAKING POLYETHERIMIDES

The present invention relates to a nitro-displacement method for making polyetherimide by reacting a dinitrobisimide with an alkali diphenoxide involving the subsequent employment of an alkali metal organic stabilizer.

As taught in the copending application of Joseph E. Wirth and Darrell Heath, Ser. No. 177,164, filed Sept. 1, 1971, and assigned to the same assignee as the present invention, polyetherimides consisting essentially of chemically combined units included by the formula (I) 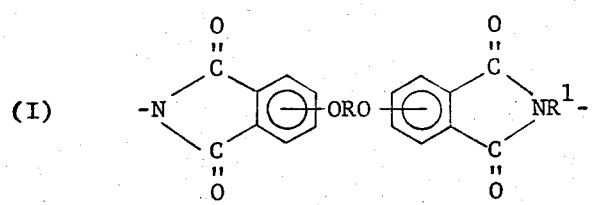

where R is an aromatic organic radical having from 6–30 carbon atoms and $R^1$ is an organic radical having from 1–20 carbon atoms can be made by effecting reaction between substantially equal moles of a dinitrobisimide of the formula, (II) 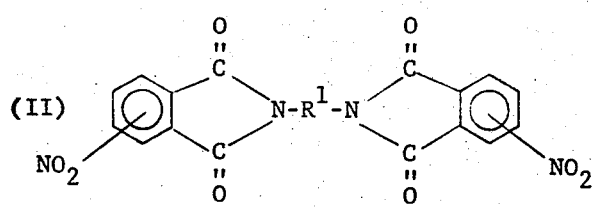

and an alkali metal salt of the formula, (III)

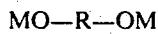

MO—R—OM where R and $R^1$ are defined above and M is an alkali metal ion such as sodium, potassium, lithium, etc. Radicals included by R, are, for example (a) the following divalent organic radicals:

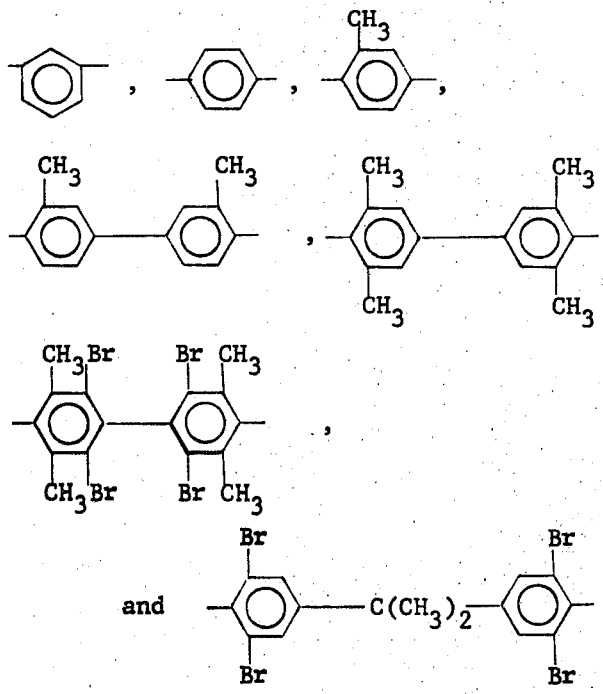

and (b) divalent organic radicals of the general formula

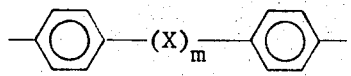

where X is a member selected from the class consisting of divalent radicals of the formulas $-C_yH_{2y}-$,

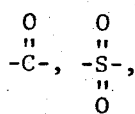

—O— and —S—, where $m$ is 0 or 1, y is a whole number from 1 to 5. Radicals included by $R^1$ are, for example, divalent organo radicals selected from the class consisting of (a) aromatic hydrocarbon radicals having from 6–20 carbon atoms and halogenated derivatives thereof, (b) alkylene radicals, $C_{(1-8)}$ alkylene terminated polydiorgano-siloxanes, and cycloalkylene radicals having from 3–20 carbon atoms, and (c) divalent radicals included by the formula

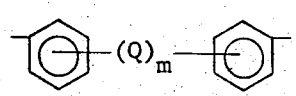

where Q is a member selected from the class consisting of —O—,

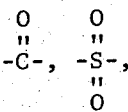

$-C_xH_{2x}-$ and $x$ is a whole number from 1 to 5 inclusive, and m is as previously defined.

As shown by Ser. No. 177,164, a variety of valuable polyetherimides useful as injection molding compounds, etc. can be made by the above-described nitro-displacement method. Experience has shown, however, that in particular instances the resulting polyetherimide also can be discolored and/or can have a tendency to form a significant amount of gel such as up to 70 percent by weight when heated at temperatures up to about 315°C, rendering the material unsuitable for further use.

The present invention is based on the discovery that if an organic solvent solution of the polyetherimide made by the above-described nitro-displacement method is treated at temperatures up to 60°C, with an effective amount of an alkali metal organic stabilizer of the formula, (IV)

$R^2X'M$, the discoloration of the polyetherimide and the tendency of the polyetherimide to gel when heated to an elevated temperature can be substantially reduced or eliminated, where R and M are as defined above, X' is selected from —O— and —S—, and $R^2$ is a monovalent organic radical selected from the class consisting of $C_{(1-8)}$ alkyl radicals, and aromatic organic radicals having from 6–20 carbon atoms, selected from the class consisting of aromatic hydrocarbon radicals and halogenated derivatives thereof.

Radicals included by $R^2$ are, for example, phenyl, tolyl, xylyl, naphthyl, chlorophenyl, bromonaphthyl, etc., and alkyl radicals such as methyl, ethyl, etc.

The alkali metal organic stabilizer can be employed up to about 10 percent by weight of polyetherimide. Stabilization can be achieved for example, by using about 5 percent by weight stabilizer based on polyetherimide, in an organic solvent defined hereinafter, and heating the solution to 60°C for 30 minutes.

Although the primary purpose of stabilization is to eliminate the tendency of polyetherimide to discolor or gel, depending upon such factors as the amount of stabilizer employed, the temperature used, the time of heating, etc., the intrinsic viscosity of the polyetherimide can be reduced slightly such as 0.01. If desired, a significant reduction in the intrinsic viscosity of the polyetherimide, such as 0.1 or more, leading to a method of viscosity control can be effected by increasing such factors as stabilizer, temperature, etc.

There is provided by the present invention, a method for substantially reducing, or entirely eliminating from polyetherimides, both discoloration, and the tendency to form a significant amount of an insoluble gel when heated to a temperature up to 315°C, where said polyetherimide has an intrinsic viscosity of at least 0.1 and is made by effecting reaction in a dipolar aprotic solvent at temperatures up to 80°C between substantially equal molar amounts of dinitro-bisimide of formula II and alkali diphenoxide of formula III, which comprises heating to a temperature of up to 60°C an organic solvent solution of said polyetherimide having at least an effective amount of alkali metal organic of formula IV for a time at least sufficient to stabilize such polyetherimide, so that it will form no more than 1 percent by weight of gel when a sample of the polyetherimide is recovered from the stabilized mixture and compression molded at 315°C for 5 minutes at pressures up to about 4,000 psi.

Included by the dinitro-bisimide compounds of formula II are, for example, bis(3-nitrophthalimido)diphenyl methane, bis(4-nitrophthalimido)diphenyl methane, bis(3-nitrophthalimido)diphenyl ether, bis(4-nitrophthalimido)-diphenyl ether, etc. These compounds can be made by effecting reaction between about 2 moles of a nitrophthalic anhydride, such as 3- or 4-nitrophthalic anhydride, per mole of an organic diamine of the formula, (V)

where $R^1$ is as previously defined. For example, a glacial acetic acid solution of either 3- or 4-nitrophthalic anhydride or a mixture thereof can be prepared using 5-10 parts of solvent per part of nitrophthalic anhydride. The organic diamine can be slowly added with stirring to the solution to produce a suspension of 2 moles of anhydride per mole of organic diamine. The suspension is refluxed for 2-12 hours. On cooling, the dinitro-bisimide crystallizes from solution and is collected on a filter and washed with glacial acetic acid. The product is dried in vacuo. The anhydrous material may be recrystallized from an appropriate solvent and redried, but it is often sufficiently pure for polymerizations without purification.

Included by the organic diamines of formula V are, for example,
m-phenylenediamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.

The alkali diphenoxides of formula III are well known and include for example the disodium salt of 2,2-bis-(4-hydroxyphenyl)propane, the disodium salt of 4,4'-dihydroxybiphenyl, the disodium salt of 4,4'-dihydroxydiphenyl sulfone, the dipotassium salt of 4,4'-dihydroxydiphenyl sulfide, etc. These alkali metal diphenoxides can be made by effecting reaction between an alkali metal hydroxide and a dihydric phenol. For example, the alkali metal salt of bisphenol-A can be obtained by reacting 2 moles of sodium hydroxide per mole of bisphenol-A. Again, alkali metal diphenoxides also can be made by adding 0.58 part of fresh cut of sodium metal to 75 parts of anhydrous methanol, with a magnetic stirrer under a nitrogen atmosphere. There is added to the mixture at the termination of the sodium reaction, 2.875 parts of bisphenol-A followed by evaporating the resulting solution to dryness. There is obtained a white solid upon drying the mixture further at 70°C.

The alkali metal organic stabilizer of formula IV also can be made by procedures involving contact between alkali metal hydroxides and monohydric phenols similar to the method used to synthesize the alkali metal diphenoxides of formula III, as well as methods shown in copending application Ser. No. 421,262 of Dwain M. White, filed concurrently herewith and directed to making polyetherimides using preformed particulated anhydrous alkali metal phenoxide salts. In a typical example, 11.5096 parts of freshly cut sodium metal was dissolved in about 500 parts of anhydrous methanol. After all the sodium had dissolved, 47.1115 parts of phenol was added and the mixture was stirred for one hour under a nitrogen atmosphere. The methanol was removed on a rotary evaporator under reduced pressure at 20 mm followed by 0.5 mm.

Dihydric phenols which can be used to make the alkali metal diphenoxides of formula III are, for example,
2,2-bis(2-hydroxyphenyl)propane;
2,4'-dihydroxydiphenylmethane;
bis(2-hydroxyphenyl)methane;
2,2-bis(4-hydroxyphenyl)propane, hereinafter identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3',5,5'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide;
hydroquinone;
resorcinol;
3,4'-dihydroxydiphenylmethane;
4,4'-dihydroxybenzophenone;
and 4,4'-dihydroxydiphenyl ether.

Phenols which can be used to make the alkali metal organic stabilizer of formula IV are, for example,

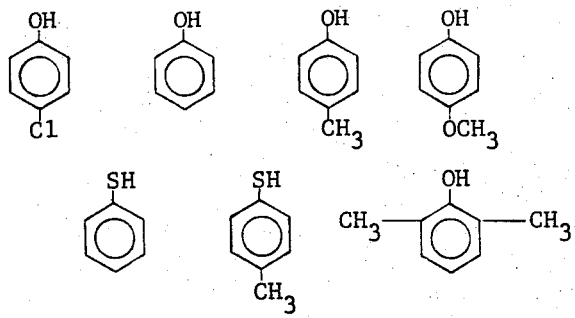

etc;

where X is halogen, hydrogen and $C_{(1-8)}$ alkyl.

In the practice of the invention, an organic solvent solution of nitro-terminated polyetherimide and alkali metal organic stabilizer or "stabilizer" is heated. The stabilizer can be added directly to the polyetherimide reaction mixture, or it can be used in combination with such nitro-terminated polymer after the polymer has been recovered.

Organic solvents which can be used to make the stabilization solution are any organic solvents which are inert to the reactants during stabilization and include dimethylsulfoxide, dimethylformamide, dimethylacetamide, tetramethylene sulfone, hexamethylphosphoramide, etc; and mixtures of these solvents with non-polar solvents such as benzene, toluene, etc. Polyetherimide solvents such as methylene chloride also can be used which are only partial solvents for the stabilizers.

Although the amount of alkali metal organic stabilizer which can be employed can vary widely, for example, about 1–10 percent by weight of stabilizer, based on the weight of nitro-terminated polyetherimide will provide for effective results, it is preferred to use about 5 percent or less. Ideally, the amount of stabilizer should be employed which is the stoichiometric equivalent of the terminal nitro radicals of the polyetherimide. It has been found that if the stoichiometric equivalent of nitro radicals on the polyetherimide is exceeded by the stabilizer, the excess stabilizer will reduce the intrinsic viscosity of the polyetherimide. In instances where a substantial reduction in intrinsic viscosity is not desirable, experience has shown that a temperature of 60°C, or below can be employed. It is also preferred to "quench" the stabilization mixture within thirty minutes or less, particularly where excess stabilizer is employed, or where a highly reactive stabilizer is used. For example, alkali metal cresoxide has been found to be a more effective, or a "faster" stabilizer than alkali metal organic stabilizer. A preferred class of stabilizer are

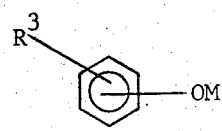

where $R^3$ is selected from $C_{(1-8)}$ alkyl, and alkoxy, and M is as previously defined.

Quenching of the polyetherimide stabilization mixture can be effected by pouring the mixture into a precipitating solvent such as methanol, water, etc. A convenient way to determine how much stabilizer to employ is to add to a small scale reaction mixture up to about 10 percent by weight of stabilizer based on the weight of the polyetherimide. The solution of polyetherimide and stabilizer is allowed to stand several minutes at ambient temperatures and thereafter the mixture is quenched. A film is made from the recovered polyetherimide by compression molding it at 315°C at pressure up to 4,000 psi using a 15 mil spacer. The resulting compression molded film is enclosed in an envelope made from a 40 mesh screen. The envelope is immersed in a stirred dimethylformamide bath at 25°C. The loss in weight after 20 hours in the bath and then drying at 110°C for four hours, indicates the gel content in the sample. If the polyetherimide has been properly stabilized there will be less than 1 percent by weight of gel based on the weight of polyetherimide.

In the absence of stabilization, it has been found that nitro-terminated polyetherimide also can be discolored, that is, tinted a yellow-tan. As a result of treatment in accordance with the practice of the invention with the alkali phenoxide stabilizer, the color of the polyetherimide can be rendered substantially lighter.

In order that those skilled in the art will be better able to practice the invention, the following examples are given by way of illustration and not by way of limitation. Intrinsic viscosities were measured in anhydrous dimethylformamide at 25°C.

EXAMPLE 1

There was added 4.7943 parts of bisphenol-A under nitrogen to a solution of sodium methoxide which was formed from 0.9661 part of sodium and 100 parts of anhydrous methanol. The solution was evaporated to dryness on a rotary evaporator and heated to 100°C at 10 torr for one hour. There was added 11.5185 parts of bis(3-nitrophthalimido)diphenyl methane to the aforementioned sodium salt of bisphenol-A along with 53 parts of dry dimethylformamide. The resulting mixture was stirred under nitrogen at 50°C for 3 hours. There was added dropwise 19 parts of the aforementioned reaction mixture to 500 parts of methanol and the resulting precipitate was reprecipitated from chloroform into methanol and dried. There was obtained 2.42 parts (sample A) of a nitro-terminated polyetherimide based on method of preparation.

There was added 0.853 part of sodium p-cresoxide to the remaining polyetherimide reaction mixture described above. The mixture was stirred for 30 minutes at 50°C and 19 parts of the mixture was then added to methanol to effect the precipitation of product following the procedure described above. There was obtained 3.16 parts (sample B) of polyetherimide based on method of preparation.

A third titer of the polyetherimide reaction mixture was removed after 24 hours to provide 2.82 parts (sample C) of polyetherimide following the procedure previously described. The remaining mixture was stirred for a total of 46 hours to provide for 3.57 parts (sample D) of polyetherimide.

Samples A-D were then measured for heat stability. For purposes of establishing polyetherimide heat stability, up to 1 percent by weight of gel or less upon heating the polymer to 315°C for 5 minutes would be considered satisfactory. In addition, the intrinsic viscosity was also determined of each of the samples in dimethylformamide at 25°C. A further heat stability test was made by compression molding samples B and C at 315°C for 5 minutes. The following results were obtained from the above-described test:

|  | A | B | C | D |
|---|---|---|---|---|
| Stabilizer | No | Yes | Yes | Yes |
| Stirred 60°C (hrs) | 0 | ½ | 24 | 46 |
| Gel (wt %) | 50% | <1 | 0 | 0 |
| Comp. Molded at 315°C (wt % gel) | — | <1 | <1 | — |
| [η] | 0.57 | 0.40 | 0.21 | 0.19 |

The above results show that nitro-terminated polyetherimide have unsatisfactory heat stability without treatment with the stabilizer in accordance with the practice of the present invention. A dramatic decrease in gel formation is shown even after a relatively short period of time when the stabilizer is employed. The above results also show that although gel formation was substantially or completely eliminated in the polyetherimide samples containing stabilizer, the intrinsic viscosity of these samples were also substantially reduced when the stabilized mixture was stirred for an extended period of time.

The above procedure was repeated. Additional samples were prepared containing the same amount of sodium cresoxide (sample E) and ½ by weight thereof (sample F) except that the sample mixtures were stirred for only 5 minutes at 60°C. It was found that the gel formation was less than 1 percent when samples E and F were compression molded at 315°C, while the intrinsic viscosities remained substantially the same.

EXAMPLE 2

There was added 8.89 parts of the sodium salt of bisphenol-A to a mixture of 17.39 parts of a bis(nitrophthalimide) and 87 parts of dimethylformamide. The bis(nitrophthalimide) was prepared by effecting reaction between an equal molar amount of methylene dianiline and an equal molar mixture of 3- and 4-nitrophthalic anhydride. The mixture was stirred under nitrogen for three hours at 50°C. The mixture was then allowed to cool to 30°C and 20 parts were added to 200 parts of water. After filtering, washing and drying, there was obtained 4.19 parts of a polyetherimide (sample G).

There was added 0.9 part of sodium p-thiocresoxide to the remaining polyetherimide reaction mixture described above. The mixture was stirred 15 minutes and then precipitated into water. There was obtained 18.02 parts (sample H) of polyetherimide.

Heat stability tests were conducted on samples G & H in accordance with the procedure of Example 1. The following results were obtained:

|  | G | H |
|---|---|---|
| Stabilizer | No | Yes |
| Gel | 28% | 0.9% |
| [η] | 0.32 | 0.30 |

The above results show that the employment of the stabilizer in accordance with the invention can stabilize the polyetherimide without substantially changing its intrinsic viscosity.

EXAMPLE 3

There was added 0.689 part of anhydrous sodium phenoxide to a solution of 14.57 parts of the polyetherimide of Example 1, sample A, and 70 parts methylene chloride. After one minute the reaction mixture was added to 300 parts methanol which was being vigorously stirred. After filtration, washing with methanol and drying, a sample of the polymer was analyzed for viscosity and thermal stability. The results are shown below:

|  | Unstabilized Polymer | Stabilized Polymer |
|---|---|---|
| [η] | 0.38 dl/g | 0.37 dl/g |
| Comp. Molded at 315°C (wt % gel) | 36% | 1% |

Although the above examples illustrate only a few of the very many polyetherimide reactants and stabilizers which can be employed in the practice of the method of the present invention, it should be understood that the present invention is directed to the production of polyetherimides having units of formula I, employing substantially equal moles of dinitro-bisimide of formula II and alkali metal salt of a dihydric phenol of formula III using alkali metal organic stabilizer of formula IV.

What we claim as new and desire to secure by Letters Patent of the United States is:

1. A method for stabilizing polyetherimide which comprises heating an organic solvent solution of said polyetherimide containing at least 1-10 percent by weight based on the weight of said polyetherimide of an alkali metal organic stabilizer of the formula,

R²X'M to a temperature of up to about 60°C for a time at least sufficient to stabilize such polyetherimide so that it will be substantially free of a tendency to gel at temperatures up to 315°C, where said polyetherimide has an intrinsic viscosity of at least 0.1 and is made by effecting reaction in a dipolar aprotic solvent at temperatures up to about 80°C between substantially equal molar amounts of a dinitro-bisimide of the formula

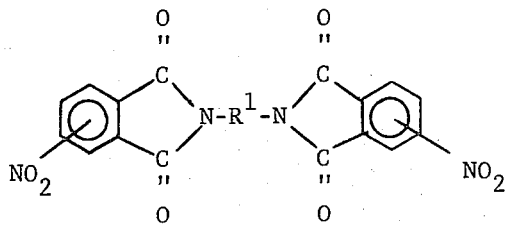

and an alkali diphenoxide of the formula

MO—R—OM where R is an aromatic organic radical having from 6–30 carbon atoms, R¹ is an organic radical having from 1–20 carbon atoms, and R² is a monovalent organic radical selected from $C_{(1-8)}$ alkyl radical and aromatic organic radicals having from 6–20 carbon atoms, X' is a member selected from the class consisting of —O— and —S—, and M is an alkali metal ion selected from the class consisting of sodium, potassium and lithium.

2. A method in accordance with claim 1, which is employed to effect a controlled reduction in the intrinsic viscosity of the polyetherimide.

3. A method in accordance with claim 1, where the polyetherimide forms no more than 1 percent by weight gel at temperatures up to 315°C.

4. A method in accordance with claim 1, where the stabilizer is an alkali metal cresoxide.

5. A method in accordance with claim 1, where polyetherimide is stabilized with about 5 percent by weight of alkali metal phenoxide.

6. A method in accordance with claim 1, where the polyetherimide is stabilized by heating with alkali metal phenoxide to a temperature of about 60°C for up to about 30 minutes.

7. A method in accordance with claim 1, where R is

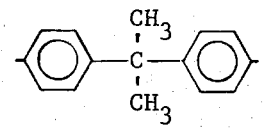

8. A method in accordance with claim 1, where R¹ is

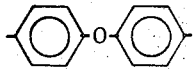

9. A method in accordance with claim 1, where R¹ is

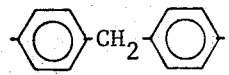

10. A method in accordance with claim 1, when the alkali metal phenoxide is sodium thiocresoxide.

* * * * *